United States Patent [19]

Howell et al.

[11] 3,800,507
[45] Apr. 2, 1974

[54] LOW PRESSURE AIR DEHYDRATOR

[75] Inventors: Clarence F. Howell; John D. Brownrigg; George H. Cooper, all of Bridgton, Maine

[73] Assignee: The United States of America as represented by the Secretary of the Navy, Washington, D.C.

[22] Filed: June 23, 1970

[21] Appl. No.: 48,995

[52] U.S. Cl............................ 55/33, 55/62, 55/179
[51] Int. Cl.......................................... B01d 53/04
[58] Field of Search............ 55/33, 58, 62, 179, 20, 55/75, 389

[56] References Cited
UNITED STATES PATENTS

| | | | |
|---|---|---|---|
| 3,085,379 | 4/1963 | Kiyonaga et al. | 55/58 |
| 2,992,703 | 7/1961 | Vasan et al. | 55/70 |
| 3,292,346 | 12/1966 | Adams | 55/33 |
| 3,359,706 | 12/1967 | Zankey | 55/20 |
| 3,225,517 | 12/1965 | Wachsmuth | 55/31 |
| 3,238,701 | 3/1966 | Holt | 55/62 |
| 3,458,973 | 8/1969 | Spencer et al. | 55/62 |

OTHER PUBLICATIONS

Anders Driline Technical Bulletin No. R-34, "On Guard Day and Night," 1959.

*Primary Examiner*—Charles N. Hart
*Attorney, Agent, or Firm*—Richard L. Stevens

[57] ABSTRACT

A method and apparatus for regenerating an adsorbent bed. A portion of the gas effluent stream used as a purge gas is cooled by passing it through a heat exchanger. The feed stream entering the onstream bed also passes through the same heat exchanger. The precooled purge gas then flows through the adsorbent bed being regenerated to reduce the temperature of the bed to operating temperature. The invention combines the features of both heated and heatless dryers to minimize purge gas and equipment requirements.

3 Claims, 2 Drawing Figures

PATENTED APR 2 1974    3,800,507

INVENTORS
CLARENCE F. HOWELL
JOHN D. BROWNRIGG
GEORGE H. COOPER
BY Crowley & Stevens
ATTORNEYS

LOW PRESSURE AIR DEHYDRATOR

BACKGROUND OF THE INVENTION

In a conventional method of fractionating gaseous mixtures by alternating and cyclic adsorption and desorption at both high and low pressures a feed stream comprising a mixture of gaseous components and containing one or more key components is introduced cyclically and in rapidly alternating sequence at a relatively high pressure into one end of each of one or more fixed beds or fractionating zones. These zones contain a bed of adsorbent material having a preselected adsorptive affinity for at least one key component of the gaseous mixture feed stream. The key component may be regarded as a contaminant or impurity such as moisture in an air stream, oil vapor, vaporous chemical degradation products, etc., or may be a component which is desired to be recovered or separated such as oxygen, nitrogen, the rare gases, helium, gas isotopes etc. During the passage of the original gaseous feed stream through one bed the entire adsorbent bed thereof is maintained under substantially relatively high pressure. After passage through this zone, those gaseous components which have not been selectively adsorbed are discharged as the gross primary output stream at the opposite or other end of the adsorbent bed.

At essentially the same time and usually prior to adsorptive saturation of the adsorbent bed, the adsorbent bed of one or more of the other fractionating zones previously on the relatively high pressure adsorption cycle is depressurized or placed on a desorption cycle by opening one of the zones to a region of reasonably low pressure such as the atmosphere.

In the regeneration cycle of the adsorbent bed when the gaseous component is being desorbed, the bed may be initially heated to aid in the desorption and subsequently cooled to bring the bed back to operating temperature.

In most gas purifying operations, such as in the removal of moisture from an air stream, the adsorption of the moisture is generally accomplished in a much shorter time than the time required to regenerate the bed. Normally to regenerate the bed it is depressurized, say to atmospheric pressure, then heated to desorb it and then the temperature of the bed brought down to the desired adsorption temperature. If the regeneration cycle could be minimized then the total time required for processing a gas stream could be significantly reduced. Attempts to reduce the regeneration cycle have been made. See, for example, U.S. Pat. No. 3,104,953. Also, it has been suggested to take a portion of the primary gross effluent stream, the purge gas, and heat this purge gas and pass it through the adsorbent bed and then subsequently allow the adsorbent bed to cool to operating temperature, for example, see U.S. Pat. No. 2,815,089. Further, in at least one refrigeration system it has been suggested to precool the purge gas, see U.S. Pat. No. 1,939,695. However, in most instances where either a separate heating and cooling fluid is used during the regeneration cycle of an adsorbent bed or where a portion of the purge gas has been used to aid in the regeneration of an adsorbent bed, this has required a complex arrangement of equipment as exemplified by the above-referenced U.S. patents. Also, normal purge gas requirements in most conventional heatless dryers consume the total dried gas output. A dual tower heated dehydrator can be somewhat less approaching perhaps 8 to 10 percent purge flow. With our invention in a dual tower dehydrator, generally only a 3 to 5 percent purge flow is required.

SUMMARY OF THE INVENTION

Our invention is generally directed to the reactivation of prior art adsorbers which generally are of the class operated at a relatively low temperature to adsorb impurities from a fluid stream and reactivated by warming at a relatively high temperature to desorb the adsorbed impurities. Briefly, the present invention is directed to an apparatus and method for removing impurities from fluid stream such as moisture from a gaseous air stream which incorporates a precooling concept to cool a feed stream to be purified and to cool a purge gas which is used in the reactivation of an adsorbent bed which is not on stream. Our invention combines the principle of both heated and heatless dryers. The invention comprises briefly at least two dehydrators adapted to be operated in a cyclic operation between an adsorption cycle and a reactivation cycle. The gas to be purified passes through a heat exchange zone where it is cooled and then flows through a desiccant bed which is under pressure. Upon discharge from the desiccant bed a portion of the output stream, purge gas, flows through a heat exchange zone where it is cooled and this precooled purge gas is depressurized, cooled and then flows through the desiccant bed which is on the regeneration cycle. It has been found through this precooling concept, particularly through the precooling of the purge gas, that the time required to reactivate an adsorbent bed is significantly reduced and/or it significantly reduces the equipment requirements of a given system for the same period of time.

Further, the arrangement and method of the invention minimizes the purge gas requirements and reduces the cycle time required for reactivation. Generally all dual tower dehydrators are designed based on the time required for the regeneration cycle since this cycle requires the longest time for completion. For example, if a given volume of air can be dried to the desired degree in two hours, the tower on the regeneration cycle normally requires four hours for complete reactivation of the bed before a feed stream can be introduced. Since the process requires alternation between towers, both towers must be designed to handle the four hour cycle. Accordingly, when the regeneration cycle can be reduced, the overall bed sizes and equipment requirements for a particular unit can be substantially reduced. With our invention, the regeneration cycle time is approximately half when compared with conventional dual tower dehydrators and accordingly, the bed size and equipment requirements are substantially reduced. Also, this type of cooling reduces the amount of purge gas required which increases the efficiency of the dehydrator since the purge gas floor is essentially lost gas to the system.

DESCRIPTION OF THE PREFERRED EMBODIMENT

Figure 1:
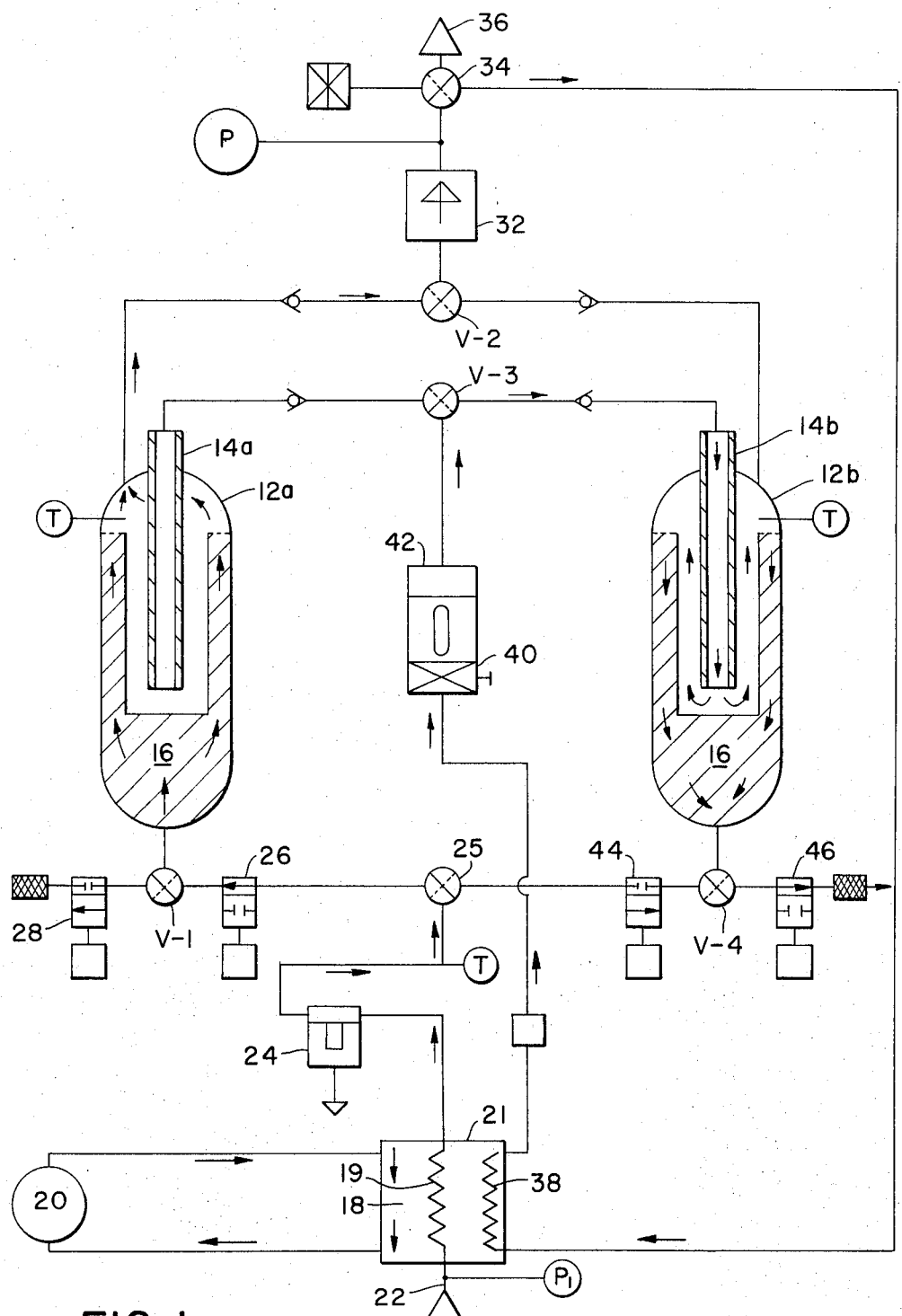
FIG. 1 is a schematic description of the drawings.

A cyclic dehydration system is shown generally at 10 and comprises a plurality of adsorbers 12a and 12b. Disposed within each adsorber are tubular heaters 14a and 14b which are used in the desorption of the adsorbent beds 16 during a regeneration cycle. An inlet 22 for the introduction of a fluid feed stream to be purified is disposed upstream of the adsorber 12a. A heat exchanger 18 is disposed intermediate the adsorber 12a and the inlet 22. As shown a refrigerant is adapted to be recycled through the heat exchanger 18. Disposed within the heat exchanger are first and second zones for the passage of the feed stream and a purge gas respectively. Downstream of the heat exchanger 18 and upstream of the adsorber 12a is a reducing valve 24.

A bypass valve 34 adapted to divert a portion of the purified gas back through the system as a purge gas is located between the adsorbers 12a and 12b. A filter 32 is disposed just upstream of the bypass valve 34. Downstream of the second zone 38 within the heat exchanger 18 is a purge meter 40, flow switch 42, and bypass valve 34. Also associated with each of the adsorbers 12a and 12b and upstream thereof are inlet valves 26 and 44 and purge valves 28 and 46.

In the operation of the invention, the feed stream at line pressure which may be between 50–175 lbs. per square inch gauge, say for example 100 lbs., which comprises an air stream from which moisture is to be removed enters the inlet 22 at between about 100° to 150° F., say for example 125° F., and flows through the zone 19 in the heat exchanger 18 where its temperature is lowered to between about 30°–60° F., say for example 45° F. This is accomplished by a countercurrent flow of a cold refrigerant such as freon in a closed loop which is driven by a compressor 20. The freon enters the heat exchanger 18 at a temperature between about 20° and 50° F., say for example 35° F. The first stage of air drying is accomplished when the feed stream flows through the filter trap 24 where the liquid water condensed by the lowered temperature in the heat exchange zone 19 is entrapped and discarded.

The second stage of the air drying is accomplished by flowing the cooled feed stream through the bypass valve 25, inlet valve 26, valve V-1 and into the desiccant bed 16 which may comprise molecular sieves. Conventional adsorbent materials can be employed to remove a variety of undesirable adsorbates entrained in the fluid mixture being processed. For example, water, carbon dioxide, ethylene, hydrogen, sulfur dioxide and poisonous substances such as carbon monoxide can be eliminated from a fluid mixture containing such adsorbates. The adsorbent material which is employed can be selected from a number of dry, generally finely divided, natural or synthetic, solid materials well known for their adsorption characteristics. Obviously, the final selection of an appropriate adsorbent material will depend upon a number of factors such as the particular substances adsorbed, e.g., their molecular weight, degree of saturation, polarity, etc., the ease and speed of reactivation of the saturated or spent adsorbent material, thermodynamic equilibrium conditions, e.g., temperature, vapor pressure, etc. Examples of adsorbents which can be used are the group of synthetic zeolites, often referred to as "Molecular Sieves," fully described in the U.S. Pat. Nos. 2,882,243, and 2,882,244, activated alumina, silica gel, activated charcoal and dolomite. The feed stream flows upwardly through the desiccant bed and then it flows out through valve V-2, the filter 32 and is discharged through the outlet 36 as a gas effluent stream. A portion of the gas effluent stream is diverted by the valve 34 and this portion comprises a purge gas.

The purge gas flows through the heat exchange zone 38 within the heat exchanger 18 where it is cooled to between about 30° to 60° F., say for example to about 45° F., and then through moisture sensor alarm. The cooled purge air then flows through the purge meter 40 where it is expanded down to atmospheric pressure and thereby further cooled. It then progresses through the flow switch interlock 42, which would turn off the tubular heater 14a if the purge flow were interrupted. The purge then flows through the valve V-3, down the center of the tubular heater 14b which is located in a well in the center of the desiccant bed 16.

The purge gas is used in two cycles of the regeneration of the adsorbent bed. First it contacts and carries the heat from the tubular heater through the adsorbent bed to desorb the bed. Secondly, the heater is deactivated and the cooled purge gas continues to flow through the bed at a low temperature and cools the bed down to operating temperature. The purge gas flows through valve V-4 and is then discharged from the adsorbent bed through the purge valve 46.

Figure 2:
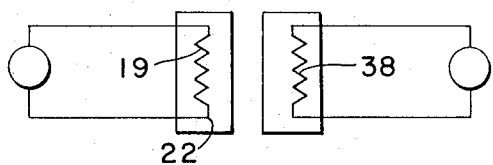
FIG. 2 is an alternative embodiment of the invention.

Although the invention has been shown wherein the inlet and purge gas flow through a common heat exchange zone, each may flow through a separate heat exchange zone as shown in FIG. 2 if varying temperatures are required. Also if desired, a separate system for initially heating the adsorbent bed being reactivated may be used rather than using the cooled purge gas. For example, during the first portion of the regeneration cycle the cooled purge gas could be discharged prior to flowing into the adsorbent bed and a separate heated stream could be used for the first portion of the cycle.

A further advantage of the apparatus and method employed with our invention is that the cooling of the purge flow by the controlled refrigeration system provides a constant temperature environment for the moisture alarm sensor thus avoiding errors associated with temperature changes. As the purge flow remains constant throughout the cycle except for the few moments when the off stream tower is repressurizing just prior to switching sides, the results are not sensibly different from having the moisture alarm sensor actually in the dryer outlet.

In apparatus of this nature the majority of temperature sensors which are used to correlate the dew point of the dried gas, may be either temperature sensitive or temperature compensated. In a temperature compensated moisture alarm sensor an electrical circuit generates an EMF which is dependent upon the temperature changes within the system. The temperature sensitive sensor is calibrated to indicate when the dew point based on temperature rises or falls about a predetermined level. For example, it may be calibrated to be actuated when the dew point is represented by a temperature of −30° F. becomes greater than a predetermined level. For this type of sensor to provide accuracy a flow of gas at a substantially constant temperature flowing through the moisture alarm sensor is required. In our arrangement, the purge gas which is the same as the dried gas effluent stream discharged from the on stream bed is always maintained at a predetermined temperature by the heat exchanger prior to flowing through the moisture alarm sensor. Accordingly, in our method and apparatus an aluminum moisture alarm sensor may be used for detecting the minimum levels of moisture found on the output gas stream. Although this type of sensor element has shown some tendency in certain circumstances to be temperature sensitive, it has been placed directly downstream of the purge gas after flowing through the heat exchanger thus stablizing the temperature flowing therethrough. Through this design the avoidance of expensive temperature stablized sensor elements may be eliminated.

Having described the invention, what we now claim is:

1. In a method for removing impurities from a gaseous stream wherein a gaseous feed stream is first cooled and then dehydrated by passing it through a first onstream bed of dehydrating material while a second offstream bed of such material is being regenerated, the feed stream is removed from the onstream bed as a gaseous effluent stream, a portion of the gaseous effluent stream is diverted as a purge gas, the purge gas is introduced into the offstream bed being regenerated, the improvement which comprises:

cooling the purge gas in a zone common with the feed stream cooling to a temperature lower than the temperature at which the purge gas leaves the onstream bed by passing said purge gas through a heat exchange system whereby the offstream bed being regenerated is reduced to an operating temperature through contact with the cooled purge gas, and further cooling the purge gas by permitting it to expand.

2. In a gas dehydration system which system includes two adsorbent beds, a feed inlet for the introduction of a cooled gaseous stream into each of the beds, and an outlet for the removal of an effluent stream from each of the beds, wherein a gaseous feed stream is introduced into an onstream bed while the other offstream bed is being regenerated, and wherein a portion of the gaseous effluent stream is diverted as a purge gas and is introduced into the offstream bed which is being regenerated, the improvement which comprises:

a refrigerant type heat exchanger for cooling the purge gas and the gaseous feed stream in a common heat exchange zone, said heat exchanger disposed upstream of the onstream bed and downstream of the offstream bed with reference to the flow of the purge gas, means in the purge gas stream for permitting expansion of the purge gas for additional cooling thereof, and a temperature sensitive moisture alarm sensor downstream of the heat exchanger gas to measure the dew point of the dried gas.

3. The system of claim 1 wherein the means for permitting expansion of the purge gas is disposed downstream of the heat exchanger.

* * * * *